3,520,950
POLYESTERS OF METAL PHTHALOCYANINE-
OCTACARBOXYLIC ACID
David E. Kramm, Laurel, Md., assignor to W. R. Grace
& Co., New York, N.Y., a corporation of Connecticut
No Drawing. Filed Dec. 29, 1966, Ser. No. 605,546
Int. Cl. C08f 21/02
U.S. Cl. 260—868                                    7 Claims

ABSTRACT OF THE DISCLOSURE

A prepolymer A is prepared by reacting a glycol with less than an equivalent amount of a difunctional organic acid. Prepolymer A is then reacted with an octa-carboxylated metal phthalocyanine to give a prepolymer B. The prepolymer B is reacted with a liquid vinyl compound in the presence of a peroxide to give a final polymer.

---

The present invention relates to a novel and useful condensation/addition polymer. More particularly, it relates to such a polymer formed by utilizing an octa-carboxylated metal phthalocyanine as one of the reactants.

It is known in the art that various metal phthalocyanine compounds can be used as reactants to form polymers. In general, the stability of the phthalocyanine ring imparts stability to the polymer produced from such compounds. In making phthalocyanine polymers, however, little use has been made of external functional groups in the formation of the polymers. Obviously, if such external functional groups were utilized in the formation of temperature resistant, colored polymers, the polymers would be highly desirable.

It is an object of the present invention to provide a new and useful class of polymers. A further object is to provide a class of polymers having high temperature resistance. A further object is to provide a group of colored polymers. Another object is to provide a process for the formation of such polymers. Other objects will become apparent as the description of the invention proceeds.

These objects are accomplished by the present invention which provides a process for forming a high molecular weight polymer which comprises reacting an equivalent of a glycol of the formula $$R(OH)_2$$

wherein R is an organic radical with from about 0.50 to about 0.95 equivalent of a difunctional organic acid in which from about 0.1 to about 0.95 of the equivalent are supplied by an acid selected from the group consisting of fumaric acid, maleic acid and maleic anhydride, at a temperature sufficient to eliminate some of the water formed in the reaction and give a prepolymer A having an acid number of from about 5 to about 100, reacting the prepolymer A with from about 0.05 to about 0.50 equivalent of a compound of the formula

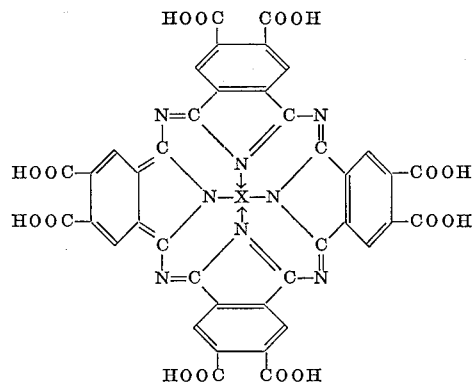

wherein X is a polyvalent metal at a temperature sufficient to substantially eliminate all of the water formed in the reaction to give a prepolymer B. The arrows in the formula signify coordinate valences.

In a preferred embodiment of the present invention, the prepolymer B is reacted with from about 5% to about 100% by weight, based on the weight of the prepolymer B, of a liquid vinyl compound of the formula $$CH_2{=}CH{-}Y$$

wherein Y is an organic radical having from 1 to about 15 carbon atoms in the presence of an organic peroxide.

The present invention also provides the polymers made by the above processes.

In preparing the prepolymer A in accordance with the present invention, a glycol is reacted with less than an equivalent amount of a difunctional organic acid to give a prepolymer A which still contains active hydroxyl groups. At least a portion of acid employed in making prepolymer A must be fumaric acid, maleic acid and/or maleic anhydride to impart the desired characteristics to the prepolymer A. It should be noted that at the elevated temperature employed for the reaction there is some isomerization of the maleic acid so that it is equivalent to the fumaric acid. Other acids may be mixed with these acids to form prepolymer A. Such acids include adipic acid, succinic acid, phthalic acid, terephthalic acid, isophthalic acid, azelaic acid, sebacic acid, and many others. The glycols which may be employed in the preparation of prepolymer A include, without limitation, 1,2-propylene glycol, 1,4-butane diol, diethylene glycol, ethylene glycol, 1,6-hexane diol, Carbowax (a trademark of Carbide and Carbon Chemicals Corp. for a series of polyethylene glycols), diethylene glycol, dipropylene glycol, pentaerythritol, trimethylolpropane, trimethylolethane, bis-phenol A, 4-hydroxymethyl benzyl alcohol and other such materials.

The prepolymer B is then formed by reacting the octa-carboxylated metal phthalocyanine with prepolymer A. Since the prepolymer A has a surplus of hydroxyl groups, the metal compound reacts with these groups to form a prepolymer B. In general, the reaction to form prepolymer A and prepolymer B will be adjusted so as to end up stoichiometrically balanced as to the carboxyl and hydroxyl groups. In some instances, the reaction does not have to be balanced and an excess of one reactant may be used.

In carrying out the reactions to form the prepolymers A and B, roughly the same temperature ranges will be used. In general, a temperature of from about 160° C. to 210° C. will be used with a range of 170° to 200° C. being preferred. In actual practice, a temperature will be selected i.e., 180° C. and some variation allowed i.e., ±5 or 10° C.

After forming the prepolymer B, the prepolymer B is reacted with a liquid vinyl compound in the presence of an organic peroxide. Suitable vinyl compounds are o-, m-, and p-divinyl benzene, 2,3-, 2,4,- 3,4-, 2,5-, and 2,6-dichloro styrene, allyl alcohol, diallyl phthalate, methyl methacrylate and the like. Other suitable compounds would be obvious to those skilled in the art. The amount of liquid vinyl compound which is employed in the process of the present invention is from about 5% to about 100% by weight based on the weight of prepolymer B. In general, an amount of about 30–75% is convenient and utilized.

A broad spectrum of organic peroxides may be utilized to initiate the addition reaction of the present invention. Such peroxides are well known in the art and include, without limitation, caprylyl peroxide, lauroyl peroxide, 2,4-dichlorobenzoyl peroxide, methyl ethyl ketone peroxide, acetyl peroxide, cyclohexanone peroxide, benzoyl peroxide, hydroxyheptyl peroxide, cumene hydroperoxide, pinane hydroperoxide and menthane hydroperoxide. Others would likewise be suitable and obvious to those skilled in the art.

In carrying out the addition polymerization any temperature from about 15° C. to about 130° C. may be employed. In general, a temperature of from about room temperature to about 85° C. will be used.

The following examples are given to illustrate the invention and are not intended to limit it in any manner. All parts are given in parts by weight unless otherwise indicated. In the examples the equivalents and acid numbers are obtained in the conventional manner.

PREPARATION OF OCTA-CARBOXYLATED METAL PHTHALOCYANINE CONDENSATION MONOMERS

An 84.0 g. sample of pyromellic anhydride and 0.116 g. of ammonia molybdate are melted at 150° C. in a tall form beaker. Next, 72.6 g. of urea and 11.16 g. of $Cu_2Cl_2$ are added with stirring. The temperature is raised to 200° C. and held there. After about 20 minutes, a green solid forms which is broken up and held at 200° C. for 5 hours to complete the reaction. The product is cooled, and washed on a Buchner filter with 1200 ml. hot distilled water followed by 500 ml. acetic acid. The product is finally washed with 2 liters of hot distilled water (90° C.) until neutral and it is then vacuum dried at 110° C. for 18 hours.

The octa-carboxylated copper phthalocyanine compound has a molecular weight of 928.14 and the following structure:

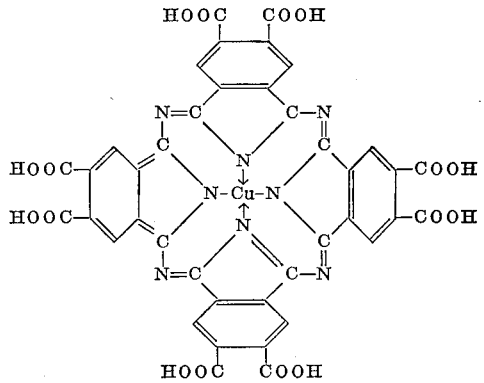

The resulting compound is a dark green powder and is obtained in a yield of about 71 g.

When 10.7 g. of $MgCl_2$ is substituted for the 11.16 g. of $Cu_2Cl_2$ in the above procedure, the corresponding magnesium compound is obtained instead of the copper compound.

When 12.5 g. of $CaCl_2$ is substituted for the 11.16 g. of $Cu_2Cl_2$ in the above procedure, the corresponding calcium compound is obtained.

When 20 g. of $PdCl_2$ is substituted for the 11.16 g. of $Cu_2Cl_2$ in the above procedure, the corresponding palladium compound is obtained.

Example 1

A high molecular weight prepolymer A is prepared by reacting in a flask 225 grams (5.0 equivalents) of 1,4-butane diol with 196.1 grams (4.0 equivalents) of maleic anhydride at a temperature of 185±5° C. The water which is formed in the reaction is removed from the reaction flask by the use of a nitrogen gas sparge, a water cooled condenser and a vacuum pump (pressure of 50–100 mm. of Hg). The reaction is allowed to proceed for about 5 hours at which time the acid number of the prepolymer A is 30.1.

The flask is opened and 116 grams (1.0 equivalent) of the octa-carboxylated copper phthalocyanine is then added. The pressure is again reduced and the flask heated to 185±5° C. utilizing the same nitrogen sparge. In this example, the carboxyl groups and the hydroxyl groups are balanced stoichiometrically. After about 1 hour and 10 minutes the acid number drops to 23 at which time heating is discontinued to give a prepolymer B in the flask.

The prepolymer B is then cooled to 131° C. and 300 mg. of hydroquinone is added as a polymerization inhibitor. The product is then cooled to room temperature. This gives a stabilized dark green viscous unsaturated polyester resin.

Example 2

A high molecular weight prepolymer A is prepared by reacting in a flask 190 grams (5.0 equivalents) of 1,2-propylene glycol with 221 grams (4.5 equivalents) of maleic anhydride at a temperature of 180±5° C. The water which is formed in the reaction is removed from the reaction flask by the use of a nitrogen gas sparge, a water cooled condenser and a vacuum pump (pressure of 50–100 mm. of Hg). The reaction is allowed to proceed for about 6 hours at which time the acid number of the prepolymer A is 38.

The flask is opened and 50 grams (0.431 equivalent) of the octa-carboxylated copper phthalocyanine is then added. The pressure is again reduced and the flask heated to 180±5° C. utilizing the same nitrogen sparge. In this example there is an excess of 0.069 equivalent of hydroxyl groups. After about 2½ hours the acid number drops to 19.5 at which time heating is discontinued. The prepolymer B is cooled to room temperature and is found to be a very highly viscous dark green fluid. The prepolymer B contains 0.59% copper and 8.61% of an esterified octa-carboxylated copper phthalocyanine.

The prepolymer B is then heated to 80° C. and 100 mg. of hydroquinone is added as a polymerization inhibitor. Liquid styrene is then added in an amount of 183 g. (about 32% by weight based on the weight of prepolymer B) while maintaining the sparging atmosphere. This gives a dark green viscous unsaturated polyester resin which is stable until a peroxide is added to the system. To form crosslinking bonds between the unsaturated polyester prepolymer B and the styrene, 2% by weight of benzoyl peroxide is added to the dark green solution at room temperature. The unsaturated polyester resin crosslinks with the styrene to form a very hard dark green polymer in a period of 30 minutes to 120 minutes. During this time the polymer can be cast into a film or shaped to any desired configuration. On curing a very hard brittle dark green polymer is formed whose surface is glossy and tack free.

Example 3

A high molecular weight prepolymer A is prepared by reacting in a flask 225 grams (5.0 equivalents) of 1,4-butane diol with 197.3 grams (4.03 equivalents) of maleic anhydride at a temperature of 185±5° C. The water which is formed in the reaction is removed from the reaction flask by the use of a nitrogen gas sparge, a water cooled condenser and a vacuum pump (pressure of 50–100 mm. of Hg). The reaction is allowed to proceed for about 4½ hours at which time the acid number of the prepolymer A is 37.

The flask is opened and 100 grams (0.862 equivalent) of the octa-carboxylated copper phthalocyanine is then added. The pressure is again reduced and the flask heated to 185±5° C. utilizing the same nitrogen sparge. In this example there is an excess of 0.108 equivalent of hydroxyl groups. After about 2 hours the acid number drops to 13 at which time heating is discontinued to give a prepolymer B in the flask. The prepolymer B contains 1.27% copper and 18.50% of an esterified octa-carboxylated copper phthalocyanine.

The prepolymer B is then cooled to 132° C. and 150 mg. of hydroquinone is added as a polymerization inhibitor. The product is then cooled to 80° C. Liquid styrene is then added in an amount of 79 g. (about 17% by weight based on the weight of the prepolymer B) while maintaining the sparging atmosphere. This gives a dark green viscous unsaturated polyester resin which is stable until a peroxide is added to the system.

Part of the polymer is then blended with more styrene to bring the styrene content up to 31% by weight, based on the weight of prepolymer B. The two samples are cured by the addition of 2% by weight benzoyl peroxide at room temperature. Tough dark green polymers form. There is no evidence of tackiness in surface.

Example 4

A high molecular weight prepolymer B is prepared in a single stage. The polymer is prepared by reacting in a flask 127 g. (2.4 equivalents) of diethylene glycol and 108 g. (2.4 equivalents) of 1,4-butane diol with 127.5 g. (2.6 equivalents) of maleic anhydride, 102.3 g. (1.4 equivalents) of adipic acid and 92.8 g. (0.8 equivalent) of octa-carboxylated copper phthalocyanine. The components are reacted in a flask at a temperature of 185±5° C. The water which is formed in the reaction is removed by the use of a nitrogen gas sparge, a water cooled condenser and a vacuum pump (pressure of 50 mm. of Hg). The reaction is allowed to proceed for about 6 hours at which time the acid number of the prepolymer B is about 24.

The prepolymer B is then cooled to 80° C. and 350 milligrams of hydroquinone is added as a polymerization inhibitor. Liquid styrene is then added in an amount of 176 g. (about 34% by weight based on the weight of the prepolymer B) while maintaining the sparging atmosphere. This gives a dark green viscous unsaturated polyester resin which is stable until peroxide is added to the system.

To form crosslinking bonds between the unsaturated polyester prepolymer B and the styrene, 2% by weight of benzoyl peroxide is added to the dark green solution at room temperature. The unsaturated polyester resin crosslinks with the styrene to form a dark green polymer which is flexible when cast as a film. The film surface is glossy and tack free and the polymer is not as brittle as the polymer of Examples 1 and 3.

Example 5

A high molecular weight prepolymer B is prepared in a single stage. The polymer is prepared by reacting in a flask. 225 g. (5.0 equivalents) of 1,4-butane diol with 88.3 (1.8 equivalents) of maleic anhydride, 161 g. (2.2 equivalents) of adipic acid and 116 g. (1.0 equivalent) of octa-carboxylated copper phthalocyanine. The components are reacted in a flask at a temperature of 190±5° C. The water which is formed in the reaction is removed by the use of a nitrogen gas sparge, a water cooled condenser and a vacuum pump (pressure 50 mm. of Hg). The reaction is allowed to proceed for about 5½ hours at which time the acid number of the prepolymer B is about 16.

The prepolymer B is then cooled to room temperature. Liquid styrene is added to 16 grams of prepolymer B in an amount of 1.5 g. (about 9.2% by weight based on the weight of the prepolymer B) in an open beaker.

To form crosslinking bonds between the unsaturated polyester prepolymer B and the styrene 2% by weight of benzoyl peroxide is added to the dark green solution at room temperature. The unsaturated polyester resin crosslinks with the styrene to form a dark green polymer which is flexible when cast as a film. The film is flexible but the surface is somewhat sticky.

Examples 6–8

When the corresponding magnesium, calcium, and palladium octa-carboxylated phthalocyanine compounds are substituted into the procedure of Example 2, substantially the same results are obtained.

While in the above examples unmodified polymers are produced, it is obvious that other materials such as dyes, pigments, fibers, comonomers and other polymers may be introduced into the polymer compositions of the present invention without substantial alteration of the physical properties. The polymer formed in accordance with the present invention can be cast to form protective films or they may be cast into other shapes by conventional techniques.

Many equivalent modifications and variations of the present invention will be apparent to those skilled in the art from a reading of the foregoing without a departure from the inventive concept.

What is claimed is:

1. A process for forming a high molecular weight polymer which comprises
   (A) reacting an equivalent of a glycol selected from the group consisting of 1,2-propylene glycol, 1,4-butane diol, diethylene glycol, ethylene glycol, 1,6-hexane diol, polyethylene glycol, diethylene glycol, dipropylene glycol, pentaerythritol, trimethylolpropane, trimethylolethane, bis-phenol A, and 4-hydroxymethyl benzyl alcohol with from about 0.50 to about 0.95 equivalent of a difunctional acid selected from the group consisting of fumaric acid, maleic acid, meleic anhydride, adipic acid, succinic acid, phthalic acid, terephthalic acid, isophthalic acid, azelaic acid, and sebacic acid in which from about 0.1 to about 0.95 of the equivalent are supplied by an acid selected from the group consisting of fumaric acid, maleic acid and maleic anhydride, at a temperature in the range of from about 160° C. to 210° C. to give a prepolymer A having an acid number of from about 5 to about 100;
   (B) reacting prepolymer A with from about 0.05 to about 0.50 equivalent of a compound of the formula

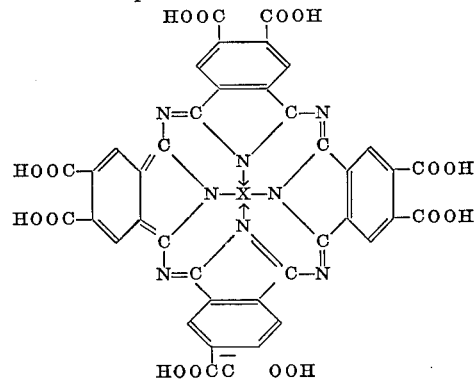

wherein X is a polyvalent metal selected from the group consisting of copper, magnesium, calcium and palladium at a temperature in the range of from about 160° C. to 210° C. to give a prepolymer B;
(C) cooling the resulting prepolymer B; and
(D) thereafter reacting prepolymer B with from about 5% to about 100% by weight, based on the weight of prepolymer B, of a liquid vinyl compound of the formula $$CH_2=CH-Y$$

wherein Y is an organic radical having from 1 to about 15 carbon atoms in the presence of an organic peroxide.

2. The process of claim 1 wherein the liquid vinyl compound is styrene.

3. The process of claim 1 wherein the glycol is 1,2-propylene glycol.

4. The process of claim 1 wherein the glycol is 1,4-butane diol.

5. The process of claim 1 wherein the glycol is diethylene glycol.

6. The process of claim 1 wherein X is copper.

7. The polymer formed by the process of claim 1.

References Cited

UNITED STATES PATENTS 2,213,726   9/1940   Wyler _____ 260—314.5
3,278,486   10/1966  Meek et al. _____ 260—47

OTHER REFERENCES

Boenig: Unsaturated Polyesters, pp. 1–5, July 1964.

WILLIAM SHORT, Primary Examiner

M. GOLDSTEIN, Assistant Examiner

U.S. Cl. X.R.

260—75

Disclaimer 3,520,950.—*David E. Kramm*, Laurel, Md. POLYESTERS OF METAL PHTHALOCYANINE-OCTACARBOXYLIC ACID. Patent dated July 21, 1970. Disclaimer filed Apr. 8, 1970, by the inventor; the assignee, *W. R. Grace & Co.*, consenting.

Hereby disclaims the terminal portion of the term of the patent subsequent to Mar. 3, 1987.

[*Official Gazette January 26, 1971*]